US008217825B2

(12) United States Patent
Kim et al.

(10) Patent No.: US 8,217,825 B2
(45) Date of Patent: Jul. 10, 2012

(54) REMOTE CONTROLLER TO SET OPERATING MODE USING ANGLES, METHOD OF SETTING OPERATING MODE THEREOF, AND METHOD OF DETERMINING HOST DEVICE

(75) Inventors: Dae-hyun Kim, Suwon-si (KR); Sung-han Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 677 days.

(21) Appl. No.: 12/348,350

(22) Filed: Jan. 5, 2009

(65) Prior Publication Data

US 2010/0001893 A1 Jan. 7, 2010

(30) Foreign Application Priority Data

Jul. 1, 2008 (KR) ................................ 2008-63444

(51) Int. Cl.
*H04L 17/02* (2006.01)

(52) U.S. Cl. ...................................................... 341/176

(58) Field of Classification Search .................. 361/176
See application file for complete search history.

(56) References Cited

U.S. PATENT DOCUMENTS 6,285,357 B1 * 9/2001 Kushiro et al. ............... 345/169
2005/0212911 A1 9/2005 Marvit et al.
2009/0284474 A1 * 11/2009 Komaki et al. ............... 345/173

OTHER PUBLICATIONS

Extended European Search Report issued Jul. 1, 2011 in EP Application No. 09154986.5.

* cited by examiner

*Primary Examiner* — Dharti Patel
(74) *Attorney, Agent, or Firm* — Stanzione & Kim, LLP

(57) ABSTRACT

A remote controller, a method of setting an operating mode thereof, and a method of determining a host device. The remote controller includes an angle detection unit to set a direction of an end of the remote controller to be a reference axis if a manipulation is input, and to detect a rotational angle between the reference axis and the front end axis of the remote controller if the remote controller rotates, and a controlling unit to control the remote controller to operate in an operating mode corresponding to the rotational angle.

25 Claims, 6 Drawing Sheets

REMOTE CONTROLLER TO SET OPERATING MODE USING ANGLES, METHOD OF SETTING OPERATING MODE THEREOF, AND METHOD OF DETERMINING HOST DEVICE

CROSS-REFERENCE TO RELATED APPLICATIONS

This application claims priority under 35 U.S.C. §119(a) from Korean Patent Application No. 2008-63444, filed on Jul. 1, 2008, in the Korean Intellectual Property Office, the contents of which are incorporated herein in its entirety by reference.

BACKGROUND OF THE INVENTION

1. Field of the Invention

The present general inventive concept relates to a remote controller, a method of setting an operating mode thereof, and a method of determining a host device, and more particularly, to a remote controller to control various host devices, a method of setting an operating mode thereof, and a method of determining a host device.

2. Description of the Related Art

Recently, as various audio/video (AV) devices have become widely used, the various AV devices each include a remote controller, and a user uses various remote controllers to control each respective AV device.

Because different remote controllers for the various AV devices have different buttons, it has become difficult for a user to recognize the functions of the various remote controllers, and also to distinguish the remote controllers for each AV device.

To solve the above problems, universal remote controllers have been developed to control various AV devices using a single remote controller. However, such universal remote controllers have disadvantages such as difficulty in distinguishing different operating modes to control each AV device, an increased number of buttons, and users not being able to clearly determine the function of all the buttons.

Accordingly, a method of conveniently using a remote controller having various operating modes is required.

SUMMARY OF THE INVENTION

The present general inventive concept provides a method of conveniently using a remote controller having various operating modes, in which an angle in relation to a reference axis is detected and the remote controller operates in an operating mode corresponding to the angle, and a method of setting an operating mode thereof.

The present general inventive concept also provides a remote controller to detect an angle in relation to a reference axis, and determine a host device to be controlled according to the detected angle and a method of controlling a host device.

Additional embodiments of the present general inventive concept will be set forth in part in the description which follows and, in part, will be obvious from the description, or may be learned by practice of the general inventive concept.

An embodiment and utilities of the present general inventive concept may be achieved by providing a remote controller, including an angle detection unit configured to set a direction of an end of the remote controller to be a reference axis if a manipulation is input, and to detect a rotational angle between the reference axis and a front end axis of the remote controller if the remote controller rotates, and a controlling unit to control the remote controller to operate in an operating mode corresponding to the rotational angle.

The angle detection unit may be at least one of an Earth magnetic field sensor and an angular velocity sensor.

The remote controller may further include a button unit; and a display unit to display a current operating mode and functions of the button unit.

If the operating mode is changed, the button unit may change functions according to the operating mode, and the display unit may display the changed functions of the button unit.

The controlling unit may change the operating mode of the remote controller according to the rotational angle so that a host device to be controlled by the remote controller is changed.

The operating mode may be set so that the button unit of the remote controller performs functions related to the host device to be controlled.

The remote controller may further include a control signal transceiver unit to transmit and receive a control signal using a radio frequency (RF) signal according to the operating mode.

The embodiment and utilities of the present general inventive concept may also be achieved by providing a method of setting an operating mode of a remote controller, the method including setting a direction of an end of the remote controller closest to a host device to be a reference axis if a manipulation is input, detecting a rotational angle between the reference axis and a front end axis of the remote controller if the remote controller rotates; and setting the remote controller to be in an operating mode corresponding to the rotational angle.

The method of detecting the rotational angle with reference to the reference axis is performed using at least one of an Earth magnetic field sensor and an angular velocity sensor.

The method may further include displaying a current operating mode and functions of a button unit.

The method may further include changing functions of the button unit according to the operating mode if the current operating mode is changed; and displaying the changed functions of the button unit.

The setting of the remote controller comprises changing the operating mode according to the rotational angle so that a host device to be controlled is changed.

The operating mode may be set so that the button unit of the remote controller performs functions related to a host device to be controlled.

The method may further include transmitting and receiving a control signal using a radio frequency (RF) signal according to the set operating mode.

An embodiment and utilities of the present general inventive concept may also be achieved by providing a remote controller to control a plurality of host devices, including an angle detection unit to detect an angle in relation to a reference axis and a controlling unit to determine a host device to be controlled according to the detected angle.

An embodiment and utilities of the present general inventive concept may also be achieved by providing a method of determining an operating mode of a remote controller to control a plurality of host devices, the method including detecting an angle of the remote controller in relation to a reference axis, and determining a host device to be controlled according to the detected angle.

An embodiment and utilities of the present general inventive concept may be achieved by providing a remote controller having a plurality of operation modes, including a control unit configured to select one of the plurality of operating modes according to an angle between an axis of the remote controller and a reference axis.

The axis of the remote controller may be an axis to connect a host device and an end of the remote controller closest to or facing the host device.

The reference axis may be an axis on which the remote controller and an external host device form an angle of 0 degrees with each other A display unit may change a location of buttons according to the angle.

An embodiment and utilities of the present general inventive concept may include an angle detection unit configured to set a direction of an end of the remote controller closest to a host device to be a reference axis, and to detect a rotational angle between the reference axis and the front end of the remote controller if the remote controller rotates, and a controlling unit to control the remote controller to operate in an operating mode corresponding to the rotational angle; wherein the controlling unit changes the operating mode of the remote controller according to the rotational angle so that a host device to be controlled by the remote controller is changed. The remote controller may further include operating modes corresponding to a predetermined range of angles.

Operating modes may correspond to a predetermined range of angles.

An embodiment and utilities of the present general inventive concept may include a computer readable medium to contain computer-readable codes as a program to perform a method in a remote controller, the method including setting a direction of an end of the remote controller to be a reference axis if a manipulation is input, detecting a rotational angle between the reference axis and a front end axis of the remote controller if the remote controller rotates, and setting the remote controller to be in an operating mode corresponding to the rotational angle.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
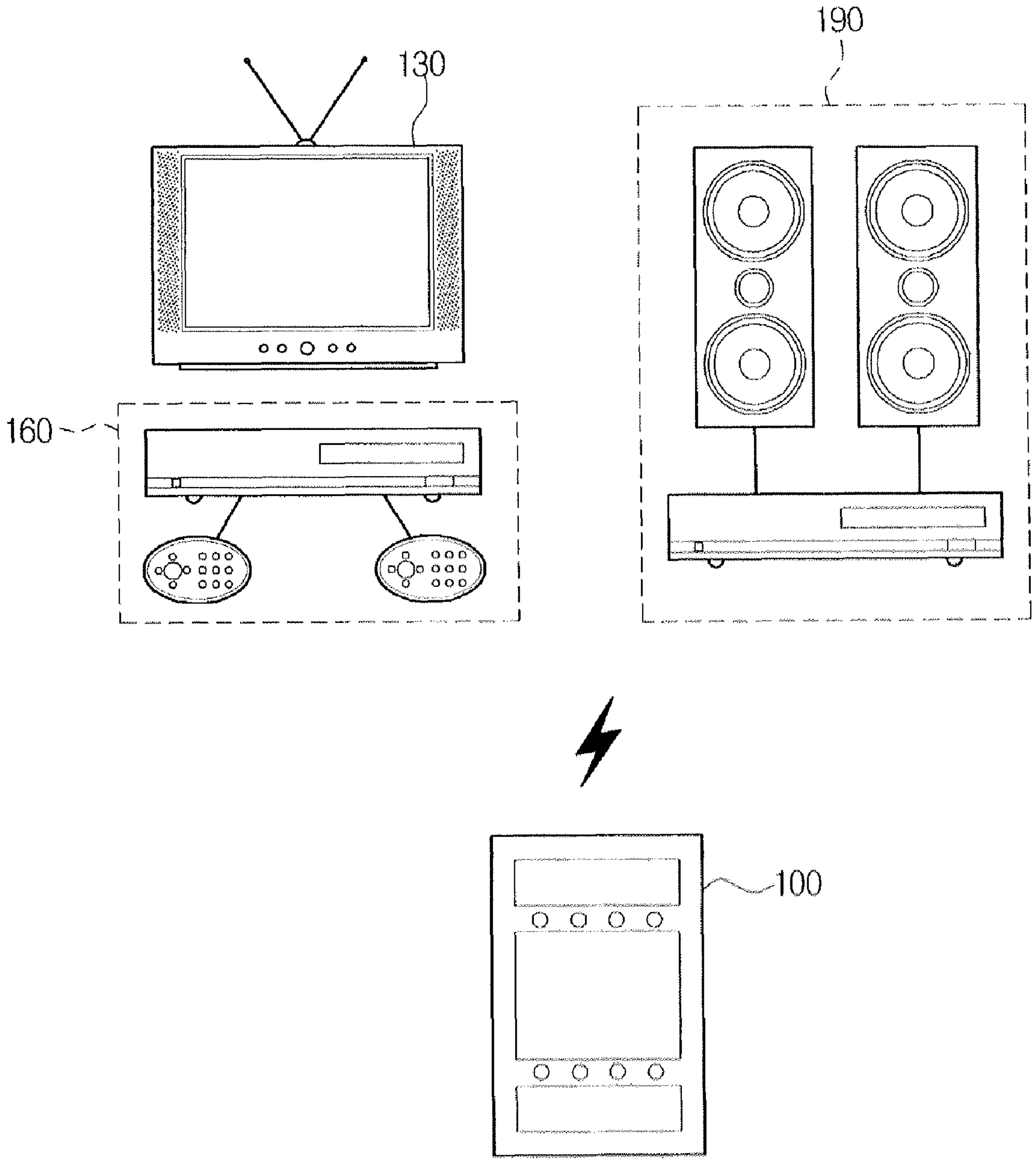
FIG. 1 is a view illustrating a plurality of host devices and a remote controller according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view of a plurality of host devices and a remote controller 100 according to an exemplary embodiment of the present general inventive concept. Referring to FIG. 1, a video system includes a plurality of host devices. The remote controller 100 may control a plurality of host devices including a television (TV) 130, a game console 160, and a home theater 190.

The remote controller 100 may be set to different operating modes to control the TV 130, the game console 160, and the home theater 190, respectively.

An operating mode is a mode in which the remote controller 100 may be set to control a function for a host device remotely. For example, operating modes of the remote controller 100 according to an exemplary embodiment of the present general inventive concept may include a TV mode, a game console mode, and a home theater mode.

The operating modes may also include various alternate modes for host devices other than those mentioned above. For example, the remote controller 100 controls the TV 130 in at least one of a broadcasting mode, a movie mode, and a news mode which are related to content of the TV 130. If a game function is added to the TV 130, the operation modes of the remote controller 100 may include a game console mode, and if functions of a digital versatile disc (DVD) player are provided by the TV 130, the operations of the remote controller 100 may include a DVD mode.

Figure 2:
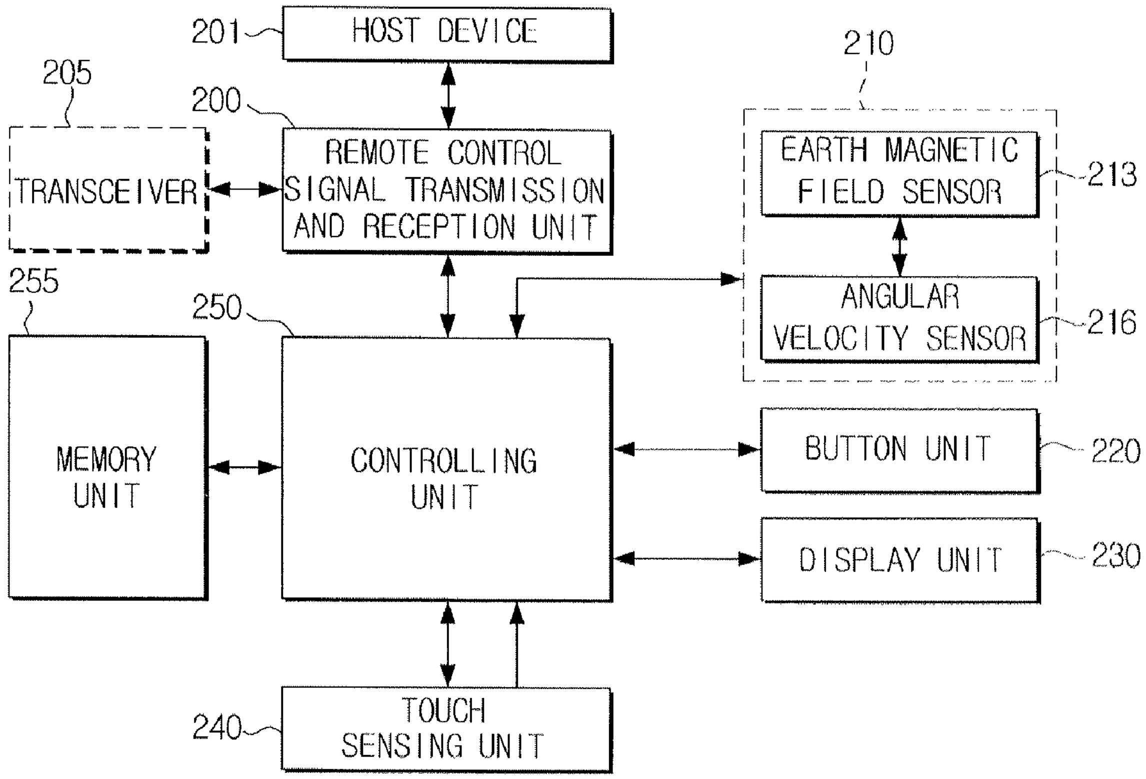
FIG. 2 is a block diagram illustrating a remote controller according to an exemplary embodiment of the present general inventive concept.

FIG. 2 is a block diagram illustrating a remote controller to control various devices according to an exemplary embodiment of the present general inventive concept.

Referring to FIGS. 1 and 2, the remote controller 100 may include a remote control signal transmission and reception unit 200 including a transceiver 205, an angle detection unit 210, a button unit 220, a display unit 230, a touch sensing unit 240, and a controlling unit 250.

Through the transceiver 205, the remote control signal transmission and reception unit 200 transmits one or more control signals to a host device 201 to be controlled and receives one or more control signals from the host device 201. The remote control signal transmission and reception unit 200 may be implemented to transmit and receive a remote control signal using an infrared ray (IR) signal. Since an IR signal is a high directional signal, the remote controller 100 may be positioned to face the host device in order to transmit a signal. Alternatively, the remote control signal transmission and reception unit 200 may be implemented to transmit and receive a remote control signal using a radio frequency (RF) signal. Since an RF signal is a non-directional signal, the remote controller 100 in this instance may transmit a remote control signal to the host device to be controlled irrespective of the direction that the remote controller 100 is facing relative to the host device.

However, the present general inventive concept is not limited thereto. Any of a number of various wireless communication methods can be used to transmit signals to and from the remote control signal transmission and reception unit 200.

The angle detection unit 210 detects an angle in relation to a reference axis with respect to the remote controller 100. Specifically, the angle detection unit 210 detects an angle between a reference axis, an axis corresponding to, for example, the end or face of the remote controller 100 closest to a host device, and a front end axis of the remote controller 100, and notifies the controlling unit 250 of the detected angle.

Here, the reference axis means an axis in which 0° is formed on a line between the remote controller 100 and the host device before the angle detection unit 210 detects an angle. In operation therefore, the angle detection unit 210 sets the reference axis prior to detecting an angle in relation to the front end axis.

The angle detection unit 210 sets a line between a point at which the host device is positioned and a point at which the remote controller 100 is positioned as the reference axis. The remote control signal transmission and reception unit 200 receives a location signal from the host device, and the angle detection unit 210 sets the line between the host device and the remote controller 100 as the reference axis using the received location signal.

In an exemplary situation, the angle detection unit 210 may set the direction of an end of the remote controller closest to or facing a host device 100 as the reference axis when a user manipulates the remote controller 100. For example, if a user presses a reference axis setting key (not illustrated) provided on the remote controller 100, the angle detection unit 210 may set the direction of the end of the remote controller 100 as the reference axis. In doing so, the reference axis is set when the user manipulates the remote controller 100, and thus the user can conveniently set a desired axis as the reference axis. The reference axis setting key may be included in the button unit 220 or the touch sensing unit 240.

Various methods rather than the above method may be used to set a reference axis. Once the reference axis is set, the angle can be detected between the reference axis and the front end axis.

Referring to FIG. 2, the angle detection unit 210 may include an Earth magnetic field sensor 213 and an angular velocity sensor 216.

The Earth magnetic field sensor 213 senses movement of the remote controller 100 using a change of position of the remote controller 100 in relation to the position of the Earth's magnetic field. The angle detection unit 210 may set a reference axis with reference to the Earth's magnetic field using the Earth magnetic field sensor 213.

The angular velocity sensor 216 detects a rotational angle between the front end axis after being manipulated by a user with reference to the position of the reference axis. The angular velocity sensor 216 may be a gyro sensor.

The angle detection unit 210 may detect the rotational angle of the front end axis in relation to the reference axis. The rotational angle is detected by the angular velocity sensor 216 with reference to the reference axis set by the Earth magnetic field sensor 213, and thus the angle detection unit 210 may detect the rotational angle of the remote controller 100.

The angle detection unit 210 may detect the angle of the remote controller 100 using methods other than the above method. For example, the angle detection unit 210 may further include an acceleration sensor (not illustrated), and detect the location and angle of the remote controller 100 using values detected by the angular velocity sensor 216 and the acceleration sensor. The controlling unit 250 may be implemented to calculate the rotational angle of the remote controller 100 with reference to the location and angle of the remote controller 100.

In one embodiment, the angle detection unit 210 of FIG. 2 includes both the Earth magnetic field sensor 213 and the angular velocity sensor 216, but in other embodiments of the present general inventive concept, the angle detection unit 210 may also be constructed to include only one of the Earth magnetic field sensor 213 and the angular velocity sensor 216.

For example, if the angle detection unit 210 includes only the Earth magnetic field sensor 213, the Earth magnetic field sensor 213 may set the direction of an end of the remote controller closest to or facing a host device 100 manipulated by a user to be a reference axis. If the remote controller 100 rotates, the Earth magnetic field sensor 213 detects a rotational angle between the reference axis and the front end axis of the remote controller 100, and outputs the detected rotational angle to the controlling unit 250.

More specifically, the Earth magnetic field sensor is a device to measure the strength and direction of the Earth's magnetic field, which a human being cannot perceive. Discussed herein is a sensor to measure the Earth magnetic field using a fluxgate which is referred to as a fluxgate Earth magnetic field sensor.

The fluxgate Earth magnetic field sensor uses materials having high magnetic permeability such as a permalloy as a magnetic core, for example. The fluxgate Earth magnetic field sensor may measure the strength and direction of an external field by measuring a second harmonic distortion which is proportional to the external field generated in a coil winding around a magnetic core disposed in the remote controller 100.

The fluxgate Earth magnetic field sensor was developed in the late 1930s, and has advantages such as high sensitivity, excellent economical efficiency, and a minimal size compared to other Earth magnetic field sensors. The fluxgate Earth magnetic field sensor has low power consumption and long term stability, and is therefore used in various fields for detecting weak magnetic fields, measuring the absolute direction of the Earth, locating minerals, detecting targets, controlling the position of satellites, and exploring space. The fluxgate Earth magnetic field sensor has been developed to enhance efficiency.

With the development of Microelectromechanical Systems (MEMS), a micromini fluxgate sensor having low power consumption may be fabricated. Such a micromini fluxgate sensor may be mounted in a mobile phone, a personal digital assistant (PDA), a laptop computer, or various other portable devices.

The Earth magnetic field sensor 213 includes an X axis fluxgate portion and a Y axis fluxgate portion which cross each other at right angles. The X and Y axis fluxgate portions each include a magnetic core having a rectangular ring shape or a bar shape, a driving coil wound around the magnetic core, and a sensing coil. The driving coil receives an electrical driving signal from an external source, and magnetizes the magnetic core. The sensing coil detects an electromotive force induced from a magnetic field generated by the driving coil.

A control unit (not illustrated) of the Earth magnetic field sensor 213 calculates a current azimuth by substituting a specific mathematical formula for values output by the X and Y axis fluxgate portions.

In a case when the angle detection unit 210 includes only the Earth magnetic field sensor 213, the angle detection unit 210 sets a reference angle using Earth's magnetic field, and detects the rotational angle of the remote controller 100 with respect to the reference angle using the calculated azimuth.

If the angle detection unit 210 includes only the angular velocity sensor 216, the angular velocity sensor 216 may set an axis to correspond to, for example, an end of the remote controller 100 closest to a host device 201 to be a reference axis when a user manipulates the remote controller 100. If the remote controller 100 rotates, the angular velocity sensor 216 detects a rotational angle between the reference axis and the front end axis of the remote controller 100, and outputs the detected rotational angle to the controlling unit 250.

The button unit 220 is provided on the remote controller 100 to receive a user command. The button unit 220 performs various functions according to the operating mode of the remote controller 100. For example, buttons of the button unit 220 may be used in a TV mode to adjust the channel or volume, and the buttons may be used in a game console mode as up, down, right and left direction keys.

The functions of the button unit 220 vary according to which operating mode is being used, and thus one of the many advantages of the remote controller 100 is to provide various functions using a small number of buttons.

The display unit 230 displays a current operating mode of the remote controller 100 and functions of the button unit 220. For example, if the current operating mode is a TV mode, the display unit displays "TV." If the operating mode is changed to a game console mode, the display unit 230 displays "GAME."

Depending on which operating mode is selected, the display unit 230 displays the function of the button unit 220 corresponding to the selected operating mode. The function of the button unit 220 changes according to the operating mode, and the display unit 230 displays the function of the button unit 220 according to the corresponding operating mode. Accordingly, a user can more easily recognize the functions currently supported by the button unit 220.

The display unit 230 may also display other content. For example, the display unit 230 may display help content of the button unit 220 or the current operating mode.

The touch sensing unit 240 senses a user's touch, and receives a user command. When a user desires to input letters, or when a user desires to move a pointer, the touch sensing unit 240 is used. The touch sensing unit 240 may be implemented as a touch pad.

The touch sensing unit 240 includes a plurality of touch areas. The touch sensing unit 240 detects an area touched by a user from among the plurality of touch areas, and causes the controlling unit 250 to determine how a user grips the remote controller 100.

The controlling unit 250 controls overall operations of the remote controller 100. The controlling unit 250 causes the remote controller 100 to operate in an operating mode corresponding to the rotational angle detected by the angle detection unit 210. The control unit 250 determines a gripping type of the remote controller 100 according to the rotational angle detected by the angle detection unit 210, and sets an operating mode of the remote controller 100 to correspond to the gripping type.

For example, if the angle detected by the angle detection unit 210 is close to 0°, that is the angle between the reference axis and the front end axis of the remote controller 100 is close to 0°, the controlling unit 250 may set the operating mode of the remote controller 100 to be a TV mode. A host device, in this instance, to be controlled by the controlling unit 250 is set to the TV 130 under the control of the controlling unit 250.

If the angle detected by the angle detection unit 210 is close to 90°, that is the angle between the reference axis and the front end axis of the remote controller 100 is close to 90°, the control unit 250 may set the operating mode of the remote controller 100 to be a game console mode. A host device, in this instance, to be controlled by the controlling unit 250 is set to the game console 160 under the control of the controlling unit 250.

If the angle detected by the angle detection unit 210 is close to 180°, that is the angle between the reference axis and the front end axis of the remote controller 100 is close to 180°, the control unit 250 may set the operating mode of the remote controller 100 to be a home theater mode. A host device, in this instance, to be controlled by the controlling unit 250 is set to the home theater 190 under the control of the controlling unit 250.

The angles 0°, 90°, 180° described above are merely examples, and it is not necessary that such angles are detected. The controlling unit 250 controls the remote controller 100 to operate in an operating mode corresponding to a range of angles, if the angle detection unit 210 detects an angle which a user recognizes is perpendicular or parallel to the reference axis.

The controlling unit 250 controls the remote controller 100 to operate in an operating mode corresponding to the angle detected by the angle detection unit 210.

The remote controller 100 uses a memory unit 255 to store programs and data corresponding to the various units of the remote controller 100. The memory unit 255 may either be external or internal to the controlling unit 250 and contain programs and data related to components such as the controlling unit 250 including the transceiver 205, the various host devices 201, the remote control signal transmission and reception unit 200, the touch sensing unit 240, the angular detection unit 210 including the earth magnetic field sensor 213 and the angular velocity sensor 216, the button unit 220, and the display unit 230.

Figure 3:
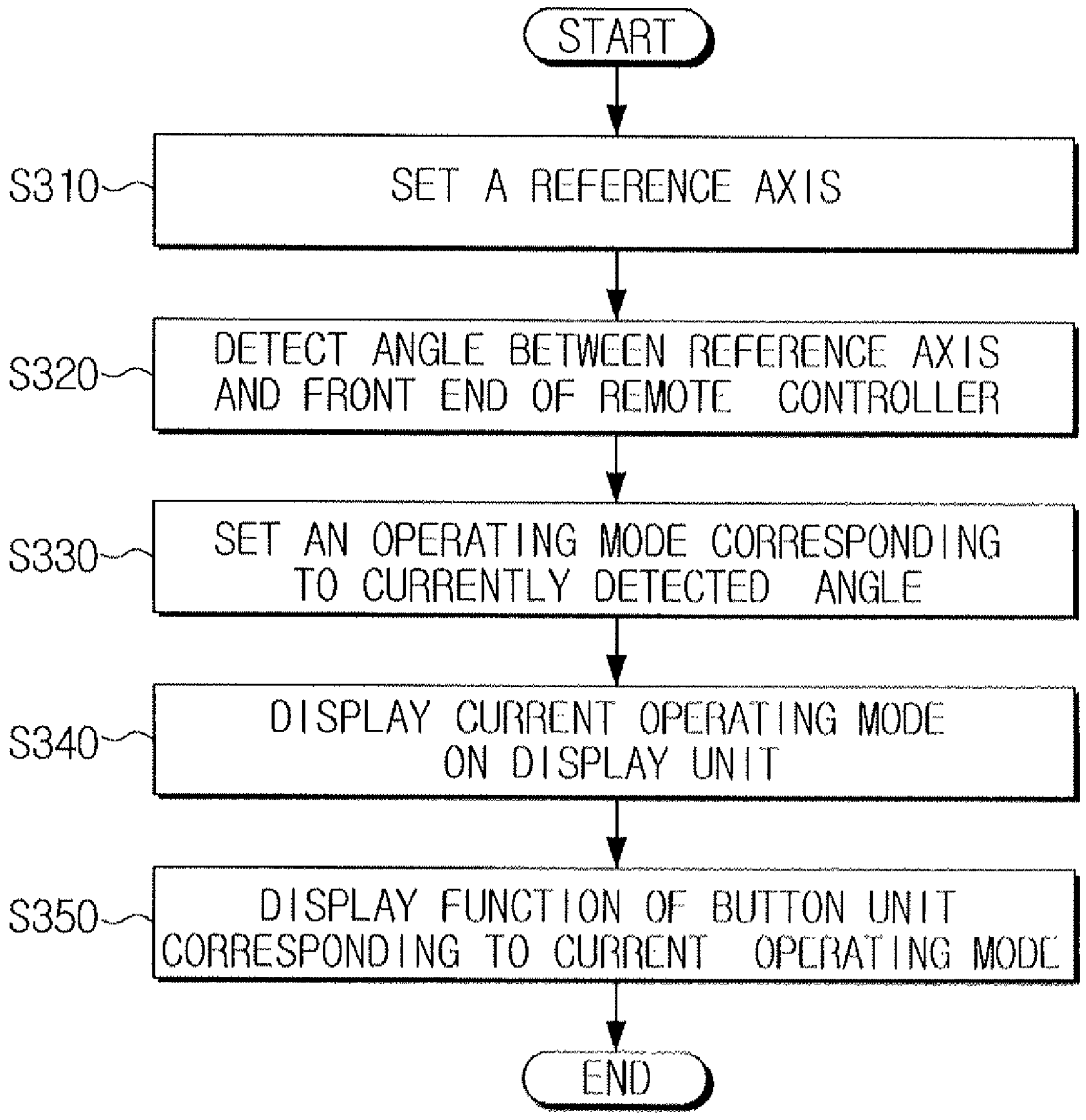
FIG. 3 is a flowchart illustrating a method of controlling a host device according to an exemplary embodiment of the present general inventive concept.

FIG. 3 is a flowchart illustrating a method of controlling a host device according to an exemplary embodiment of the present general inventive concept.

Using a remote controller 100, the remote controller 100 may set a reference axis to detect an angle in operation S310. The reference axis is an axis to form 0° in relation to a host device when the remote controller 100 detects an angle.

The remote controller 100 may set a line connecting the host device to the remote controller 100 to be a reference axis.

The remote controller 100 may set the direction of an end of the remote controller closest to or facing a host device 100 which is manipulated by a user to be a reference axis. For example, if a user presses a reference axis setting key (not shown) provided on the remote controller 100, the remote controller 100 sets the direction of the front end thereof to be a reference axis. If a reference axis is set when a user manipulates the remote controller 100, the user may set easily a desired reference axis.

The remote controller 100 may use the Earth magnetic field sensor 213 to set a reference axis.

The remote controller 100 detects an angle between the reference axis and the front end axis of the remote controller 100 in operation S320. The remote controller 100 detects a rotational angle with reference to the reference axis set using the above method. The remote controller 100 may detect a rotational angle using the angular velocity sensor 216 of the angle detection unit 210.

The remote controller 100 is set in an operating mode corresponding to the currently detected angle in operation S330. The controlling unit 250 of the remote controller 100 receives the angle detected by the angle detection unit 210, and controls the remote controller 100 to operate in an operating mode corresponding to the current angle.

The remote controller 100 displays the current operating mode on the display unit 230 in operation S340. For example, if the operating mode is a TV mode, the display unit 230 displays "TV." If the operating mode is changed to a game console mode, the display unit 230 displays "GAME."

The remote controller 100 displays the function of the button unit 220 corresponding to the current operating mode on the display unit 230 in operation S350. The function of the button unit 220 changes according to the operating mode.

Accordingly, the display unit 230 displays the function of the button unit 220, and thus a user can easily recognize the function currently provided by the button unit 220.

In doing so, a method of controlling a host device of the remote controller 100 may be provided.

Hereinbelow, modes of the remote controller 100 depending on the angle of the remote controller 100, that is, a TV mode, a home theater mode, and a game console mode, will be explained with reference to FIGS. 4 to 6.

Figure 4:
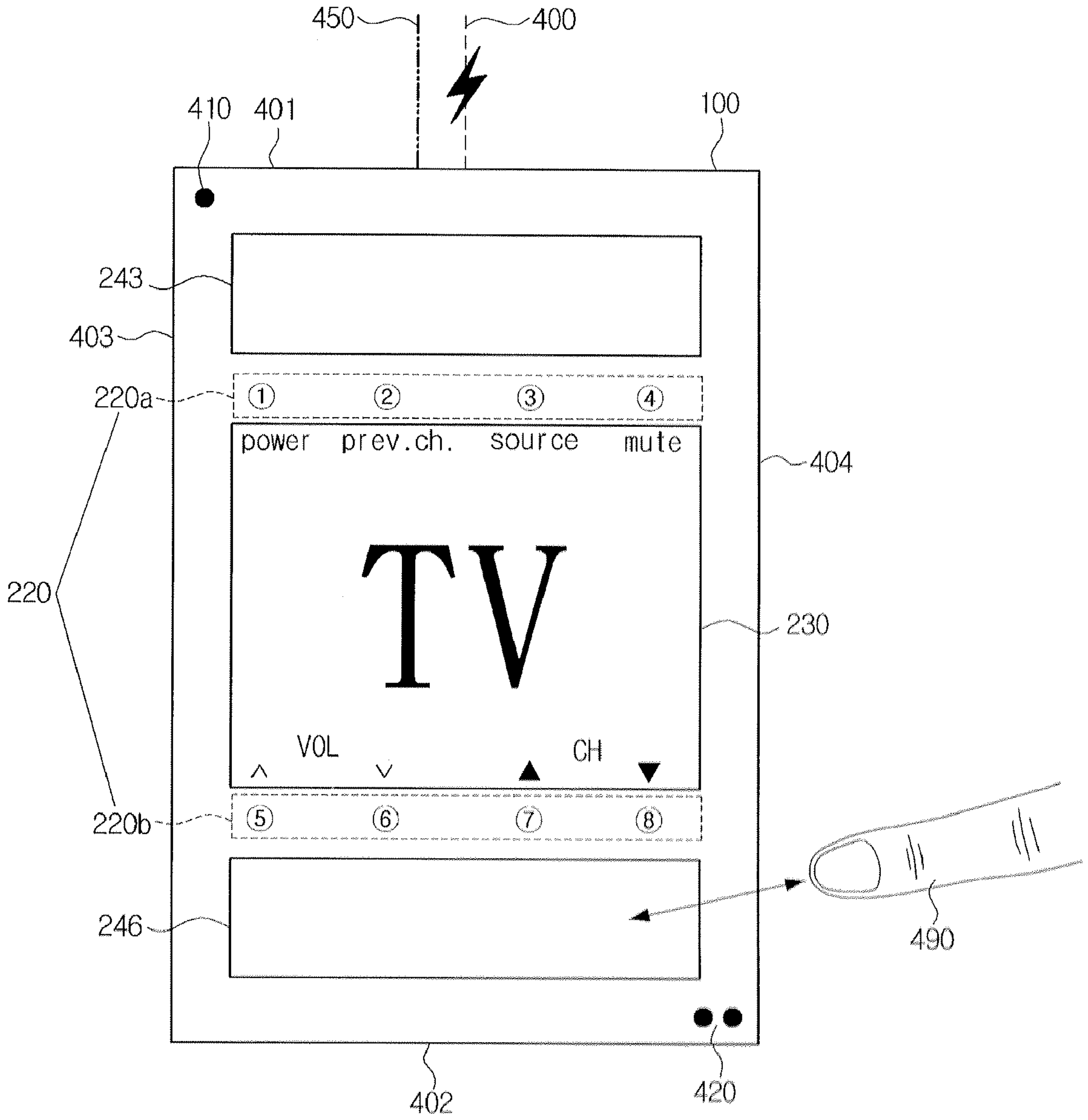
FIG. 4 is a view illustrating a remote controller which is set to a TV mode according to an exemplary embodiment of the present general inventive concept.

FIG. 4 is a view of a remote controller which is set to a TV mode according to an exemplary embodiment of the present general inventive concept. Referring to FIGS. 2 and 4, an external surface of the remote controller 100 may include a button unit 220 comprising a first sub-button unit 220*a* and a second sub-button unit 220*b*, a display unit 230, a first touch sensing unit 243, and a second touch sensing unit 246. A front end mark 410 and a rear end mark 420 are also displayed on the external surface of the remote controller 100. As shown in FIG. 4, the perimeter of the remote controller 100 includes a front end 401, a rear end 402, a first side end 403 and a second side end 404.

Functions of the button unit 220, the display unit 230, the first touch sensing unit 243, and the second touch sensing unit 246 which are also found in FIG. 3 were discussed previously.

The front end mark 410 corresponds to the front end of the remote controller 100, and the rear end mark 420 corresponds to the rear end of the remote controller 100. If the remote controller 100 is formed so that the front end is symmetrical to the rear end, such marks are displayed in order to distinguish the front end and the rear end. A front end axis 450 of the remote controller 100 represents a vertical axis of the front end.

In FIG. 4, the front end axis 450 of the remote controller 100 is parallel to a reference axis 400. That is, the front end axis 450 may be perpendicular to a line that extends along the front end 401 of the remote controller 100. The angle between the reference axis 400 and the front end axis 450 of the remote controller 100 is 0°. As "TV" is displayed on the display unit 230, the current operating mode is in a TV mode. That is, when the angle between the reference axis 400 and the front end axis 450 of the remote controller 100 is approximately 0°, the remote controller 100 is set to a TV mode, a host device to be controlled by the remote controller 100 is the TV 130.

The button unit 220 including sub-button units 220*a* and 220*b* further include buttons ① to ⑧, and the functions of the buttons ① to ⑧ are listed in order as "power," "prev.ch," "source," "mute," "vol up," "vol down," "ch up," and "ch down." The functions of the button unit 220 are used in a TV mode which is the operating mode shown in FIG. 4, for example. The functions of the button unit 220 are also displayed on corresponding portions of the display unit 230.

If a user 490 grips the remote controller 100 as shown in FIG. 4, the user's hand may touch the second touch sensing unit 246. When the touch is detected from the second touch sensing unit 246, the remote controller 100 may be implemented to operate in a TV mode.

Figure 5:
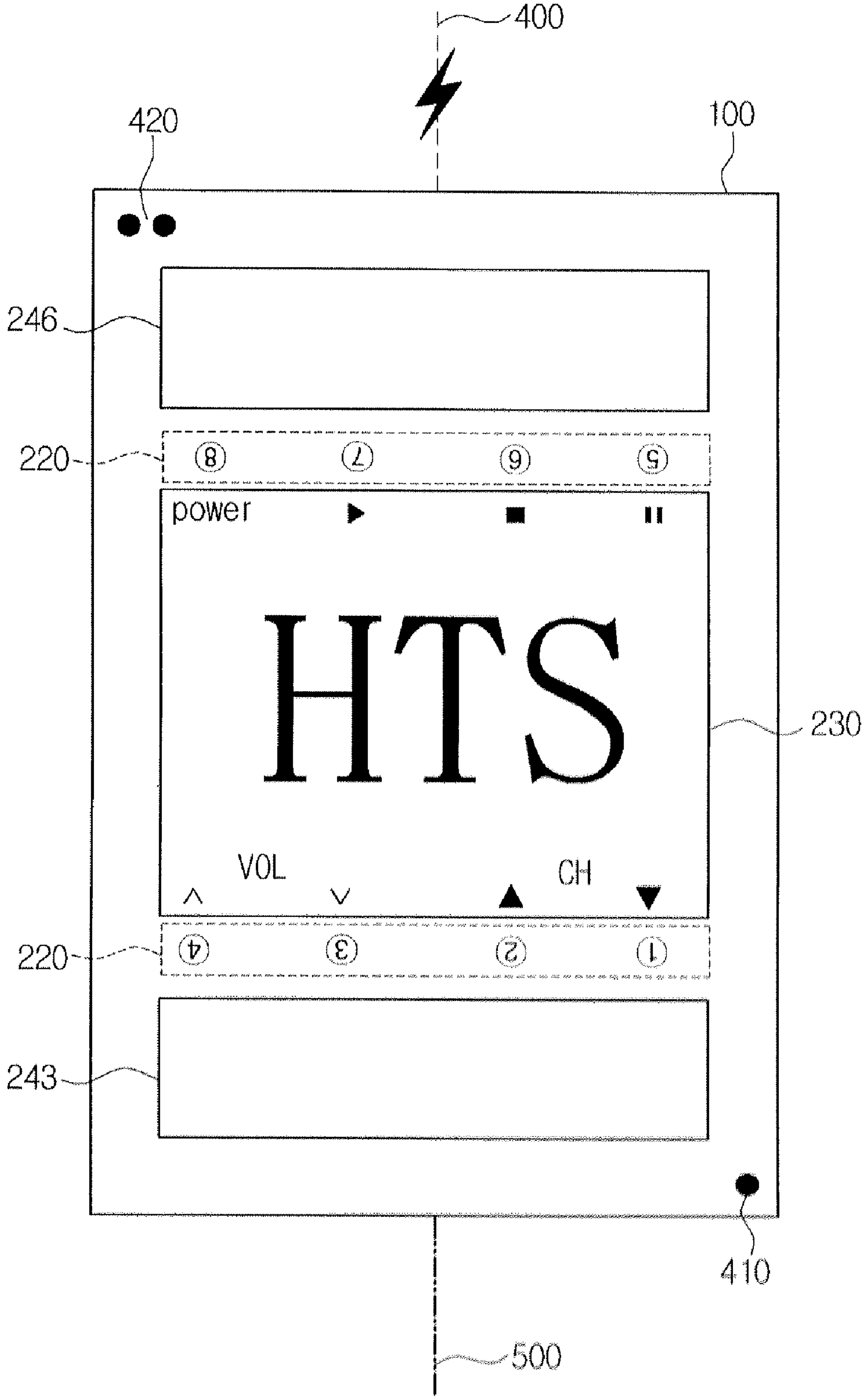
FIG. 5 is a view illustrating a remote controller which is set to a home theater system (HTS) mode according to another exemplary embodiment of the present general inventive concept.

FIG. 5 is a view illustrating a remote controller which is set to a home theater system (HTS) mode according to another exemplary embodiment of the present general inventive concept. In FIG. 5, a front end axis 500 of the remote controller 100 is placed in opposition to the reference axis 400. The angle between the reference axis 400 and the front end axis 500 of the remote controller 100 is approximately 180°. As the display unit 230 displays "HTS" thereon, the operating mode is in a home theater mode. That is, if the angle between the reference axis 400 and the front end axis 500 of the remote controller 100 is approximately 180°, the remote controller 100 is set to a home theater mode, and a host device to be controlled by the remote controller 100 is the home theater 190.

The button unit 220 includes buttons ① to ⑧, and functions of the buttons ① to ⑧ are listed in order as "ch down," "ch up," "vol down," "vol up," "pause," "stop," "play," and "power." The functions of the button unit 220 are used in a home theater mode which is a current operating mode. The functions of the button unit 220 are also displayed on corresponding portions of the display unit 230.

The functions of the button unit 220 are changed from those of FIG. 4. However, even if the functions of the button unit 220 are changed, the functions are displayed on the display unit 230. Therefore, a user can easily recognize the functions of the button unit 220.

If a user grips the remote controller 100 as shown in FIG. 5, the user's hand may touch the first touch sensing unit 243. When the touch is detected from the first touch sensing unit 243, the remote controller 100 may be implemented to operate in a home theater mode.

Figure 6:
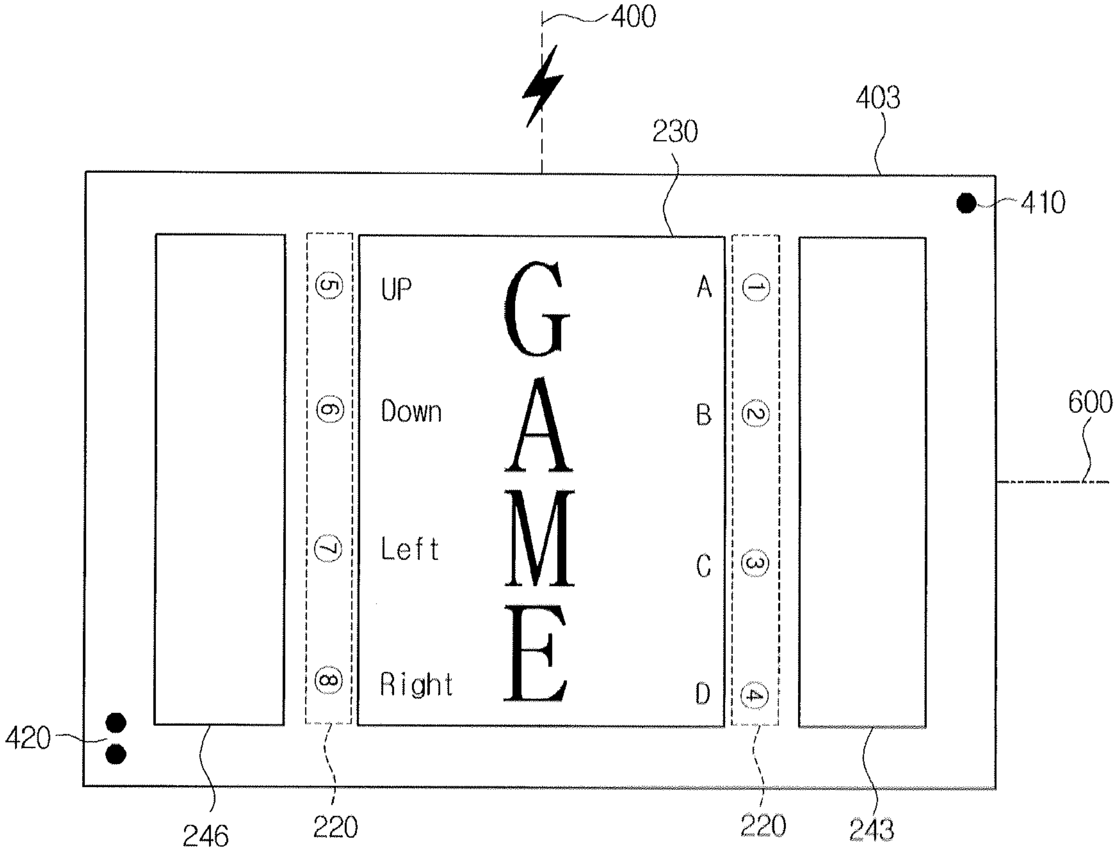
FIG. 6 is a view illustrating a remote controller which is set to a game console mode according to another exemplary embodiment of the present general inventive concept.

FIG. 6 is a view illustrating a remote controller which is set to a game console mode according to another exemplary embodiment of the present general inventive concept. Referring to FIG. 6, a front end axis 600 of the remote controller 100 is turned perpendicular to the reference axis 400. The angle between the reference axis 400 on a first side end 403 of the remote controller 100 and the front end axis 600 of the remote controller 100 is thus approximately 90°. As the display unit 230 displays "GAME" thereon, the current operating mode is a game console mode. That is, if the angle between the reference axis 400 and the front end axis 600 of the remote controller 100 is approximately 90°, the remote controller 100 is set to a game console mode, and the host device to be controlled by the remote controller 100 is the game console 160.

The button unit 220 includes buttons ① to ⑧, and the functions of the buttons ① to ⑧ are given in order as "A," "B," "C," "D," "up," "down," "left," and "right." The functions of the button unit 220 are used in a game console mode which is the current operating mode. The functions of the button unit 220 are also displayed on the corresponding portions of the display unit 230.

The functions of the button unit 220 are changed in comparison with FIGS. 4 and 5. However, even if the functions of the button unit 220 changes, the functions are displayed on the display unit 230. Therefore, a user can easily recognize the functions of the button unit 220.

If a user grips the remote controller 100 as shown in FIG. 6, the user may grip the remote controller 100 using both hands. The user's hands may touch the first and second touch sensing units 243 and 246. When the touch is detected from the first and second touch sensing unit 243 and 246, the remote controller 100 may be implemented to operate in a game console mode.

As described above, the operating mode of the remote controller 100 varies according to the angle of the remote controller 100. A user may change an operating mode by rotating the remote controller 100, and thus may more conveniently select a desired operating mode.

In this exemplary embodiment of the present general inventive concept, the rotational angle is 0°, 90°, or 180°. However, operating modes corresponding to a predetermined range of angles may also be provided. For example, it may be implemented that an angle ranging from 0° to 45° corresponds to a TV mode, an angle ranging from 45° to 135° corresponds to a game console mode, and an angle ranging from 135° to 180° corresponds to a home theater mode.

While the operating mode includes a TV mode, a home theater mode, and a game console mode in this exemplary embodiment of the preset general inventive concept, other operating modes may also be applied to the present general inventive concept.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While this exemplary embodiment of the present general inventive concept is applied to a method of setting a mode of the remote controller, the exemplary embodiment of the present general may also be applied to any portable apparatus which includes a plurality of operating modes other than the above operating modes. Such portable apparatuses may include a portable media player (PMP), an MPEG layer 3 (MP3) player, a mobile phone, and a personal digital assistant (PDA). For example, this exemplary embodiment of the present general inventive concept may be applied to an MP3 player. In this case, if a user grips the MP3 player at 0°, the MP3 player may operate in a music mode, if a user grips the MP3 player at 90°, the MP3 player may operate in a moving picture mode, and if a user grips the MP3 player at 180°, the MP3 player may operate in game console mode.

According to various exemplary embodiment of the present general inventive concept, a remote controller and a method of setting an operating mode thereof are provided, in which an angle between different axes is detected by the controller, and the remote controller operates in an operating mode corresponding to the detected angle. In this way, for example, a user can more conveniently use the remote controller having various operating modes.

The functions provided by buttons of the remote controller vary according to the operating modes, and thus a user can use various functions using a small number of buttons. The functions of the buttons are displayed on a display, so a user can easily recognize the functions of the buttons.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A remote controller, comprising:

an angle detection unit configured to set a direction of a front end of the remote controller to be a reference axis if a manipulation is input, and to detect a rotational angle between the reference axis and an axis of the front end of the remote controller if the front end of the remote controller rotates in a horizontal direction; and a controlling unit to control the remote controller to operate in an operating mode corresponding to the rotational angle.

2. The remote controller of claim 1, wherein the angle detection unit is at least one of an Earth magnetic field sensor and an angular velocity sensor.

3. The remote controller of claim 1, further comprising:

a button unit; and a display unit to display a current operating mode and functions of the button unit.

4. The remote controller of claim 3, wherein if the operating mode is changed, the button unit changes functions according to the operating mode, and the display unit displays the changed functions of the button unit.

5. The remote controller of claim 1, wherein the controlling unit changes the operating mode of the remote controller according to the rotational angle so that a host device to be controlled by the remote controller is changed.

6. The remote controller of claim 1, wherein the operating mode is set so that the button unit of the remote controller performs functions related to the host device to be controlled.

7. The remote controller of claim 1, further comprising:

a control signal transceiver unit to transmit and receive a control signal using a radio frequency (RF) signal according to the operating mode.

8. A method of setting an operating mode of a remote controller, the method comprising:

setting a direction of a front end of the remote controller to be a reference axis if a manipulation is input, detecting a rotational angle between the reference axis and an axis of the front end of the remote controller if the front end of the remote controller rotates in a horizontal direction; and setting the remote controller to be in an operating mode corresponding to the rotational angle.

9. The method of claim 8, wherein the detecting of the rotational angle with reference to the reference axis is performed using at least one of an Earth magnetic field sensor and an angular velocity sensor.

10. The method of claim 8, further comprising:

displaying a current operating mode and functions of a button unit.

11. The method of claim 10, further comprising:

changing functions of the button unit according to the operating mode if the current operating mode is changed; and displaying the changed functions of the button unit.

12. The method of claim 8, wherein the setting of the remote controller comprises changing the operating mode according to the rotational angle so that a host device to be controlled is changed.

13. The method of claim 8, wherein the operating mode is set so that the button unit of the remote controller performs functions related to a host device to be controlled.

14. The method of claim 8, further comprising:

transmitting and receiving a control signal using a radio frequency (RF) signal according to the set operating mode.

15. A remote controller to control a plurality of host devices, comprising:

an angle detection unit to detect an angle in relation to a rotation angle between an axis of the front end of the remote controller and a reference axis in a horizontal direction; and a controlling unit to determine a host device to be controlled according to the detected angle.

16. A method of determining an operating mode of a remote controller to control a plurality of host devices, the method comprising:

detecting an angle of the remote controller in relation to a rotation angle between an axis of the front end of the remote controller and a reference axis in a horizontal direction; and determining a host device to be controlled according to the detected angle.

17. A remote controller having a plurality of operation modes comprising:

a control unit configured to select one of the plurality of operating modes according to a rotation angle between an axis of the front end of the remote controller and a reference axis in a horizontal direction.

18. The remote controller of claim 17, wherein the axis of the remote controller is an axis to connect a host device and an end of the remote controller closest to or facing the host device.

19. The remote controller of claim 17, wherein the reference axis is an axis on which the remote controller and an external host device form an angle of 0 degrees in relation to each other.

20. The remote controller of claim 17, comprising:

a display unit to change a location of buttons to be displayed according to the angle.

21. A non-transitory computer readable medium to contain computer-readable codes as a program to perform a method in a remote controller, the method comprising:

setting a direction of a front end of the remote controller to be a reference axis if a manipulation is input, detecting a rotational angle between the reference axis and an axis of the front end of the remote controller if the front end of the remote controller rotates in a horizontal direction; and setting the remote controller to be in an operating mode corresponding to the rotational angle.

22. The remote controller of claim 15, further comprising:

a touch sensing unit including a plurality of touch areas to detect an area of the remote controller touched by a user and to determine the orientation of the remote controller based on the area touched by the user.

23. The remote controller of claim 22, wherein the touch sensing unit determines the orientation of the remote controller based on the area touched by the user.

24. The remote controller of claim 1, further comprising:

a display unit including a display area disposed at a center region of the remote controller;

a plurality of button units disposed on opposing sides of the display area, wherein the control unit further controls the remote controller to change functions and display different button units depending on the operating mode that corresponds to the rotational angle.

25. The method of claim 8, further comprising:

displaying a plurality of buttons on opposing sides of a display area, wherein the setting of the remote controller further includes changing the display and functionality of the buttons depending on the operating mode.

* * * * *